(12) United States Patent
Forster et al.

(10) Patent No.: US 9,514,152 B2
(45) Date of Patent: Dec. 6, 2016

(54) METHOD AND APPARATUS FOR STORAGE OF DATA RECORDS

(71) Applicant: Telefonaktiebolaget L M Ericsson (publ), Stockholm (SE)

(72) Inventors: Manfred Forster, Gross-Umstadt (DE); Elisabeth Mueller, Mainz (DE); Peter Sorg, Hofheim am Taunus (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 14/381,065

(22) PCT Filed: Dec. 21, 2012

(86) PCT No.: PCT/SE2012/051483
§ 371 (c)(1),
(2) Date: Aug. 26, 2014

(87) PCT Pub. No.: WO2013/129988
PCT Pub. Date: Sep. 6, 2013

(65) Prior Publication Data
US 2015/0019514 A1    Jan. 15, 2015

Related U.S. Application Data

(60) Provisional application No. 61/604,797, filed on Feb. 29, 2012.

(51) Int. Cl.
G06F 17/30 (2006.01)
G06Q 40/00 (2012.01)
H04M 15/00 (2006.01)

(52) U.S. Cl.
CPC ... G06F 17/30221 (2013.01); G06F 17/30091 (2013.01); G06F 17/30153 (2013.01);
(Continued)

(58) Field of Classification Search
None
See application file for complete search history.

(56) References Cited

U.S. PATENT DOCUMENTS 5,682,422 A * 10/1997 Oliver .............. H04M 11/002
340/870.02
6,078,785 A * 6/2000 Bush ................ H04B 7/2606
340/870.02
(Continued)

FOREIGN PATENT DOCUMENTS

DE 10346802 A1 4/2005
GB 2382689 A 6/2003

Primary Examiner — Syed Hasan
(74) Attorney, Agent, or Firm — Murphy, Bilak & Homiller, PLLC

(57) ABSTRACT

Method and data access unit for storage of data records for creating a serialized charging record formatted for insertion into a charging database. The method includes traversing the hierarchical charging record and for each part node of said hierarchical charging record identifying an attribute of the part node and determining if said attribute is a key attribute or a search attribute and if affirmative storing an attribute value of said attribute in a field of the serialized charging record based on a charging database configuration definition. A part segment comprising the attribute value and a data value token is stored in a payload body field of the serialized charging record with a part node indicator representing the location of the part node in the hierarchical charging record based on a hierarchical charging record configuration definition. A method and data access unit for creating a hierarchical charging record is also disclosed. An advantage is that a serialized charging record may be stored in one storage entity such as a table row.

24 Claims, 13 Drawing Sheets

(52) U.S. Cl.
CPC ....... *G06F 17/30961* (2013.01); *G06Q 40/12* (2013.12); *H04M 15/41* (2013.01); *H04M 15/43* (2013.01); *H04M 15/74* (2013.01)

(56) References Cited

U.S. PATENT DOCUMENTS

| | | |
|---|---|---|
| 6,385,301 B1 | 5/2002 | Nolting et al. |
| 2002/0009182 A1* | 1/2002 | Perkins, III ........... H04M 15/00 379/114.01 |
| 2002/0037709 A1* | 3/2002 | Bhatia ................. G06F 17/3087 455/414.2 |
| 2003/0101194 A1 | 5/2003 | Rys et al. |
| 2003/0110186 A1* | 6/2003 | Markowski ....... G06F 17/30893 |
| 2004/0103289 A1* | 5/2004 | Akama ................. H04W 60/00 713/186 |
| 2004/0243343 A1* | 12/2004 | Nelson ................... G06Q 40/06 702/182 |
| 2008/0086470 A1 | 4/2008 | Graefe |
| 2010/0185593 A1 | 7/2010 | Wong et al. |
| 2011/0244872 A1* | 10/2011 | Quinn ............... G06F 17/30867 455/445 |
| 2012/0246325 A1* | 9/2012 | Pancorbo Marcos ............... H04L 12/2602 709/227 |
| 2013/0198838 A1* | 8/2013 | Schmidt ................ H04L 9/3234 726/22 |
| 2015/0094017 A1* | 4/2015 | Guionnet ........... H04M 15/723 455/405 |

\* cited by examiner

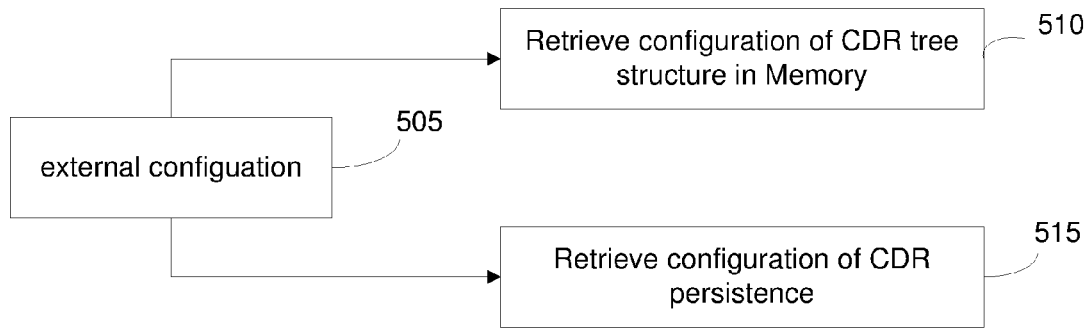
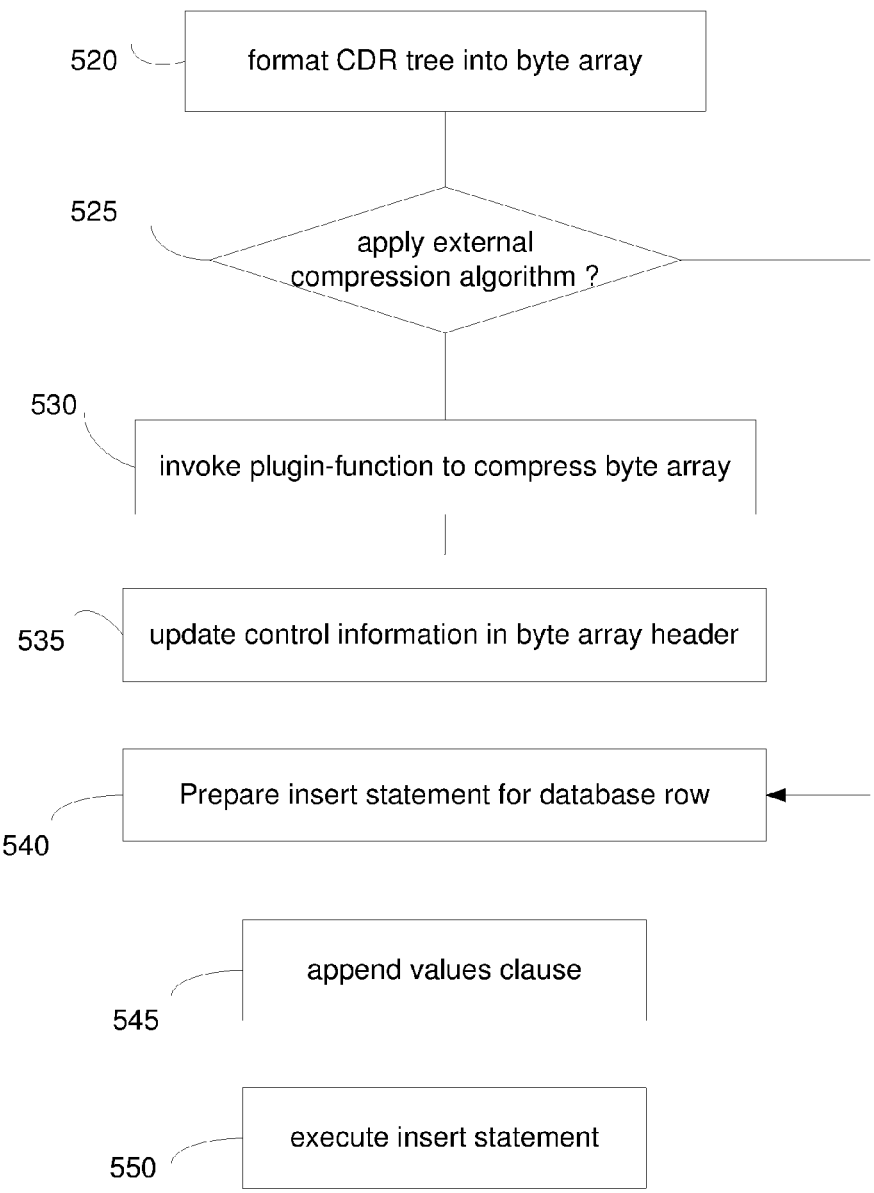

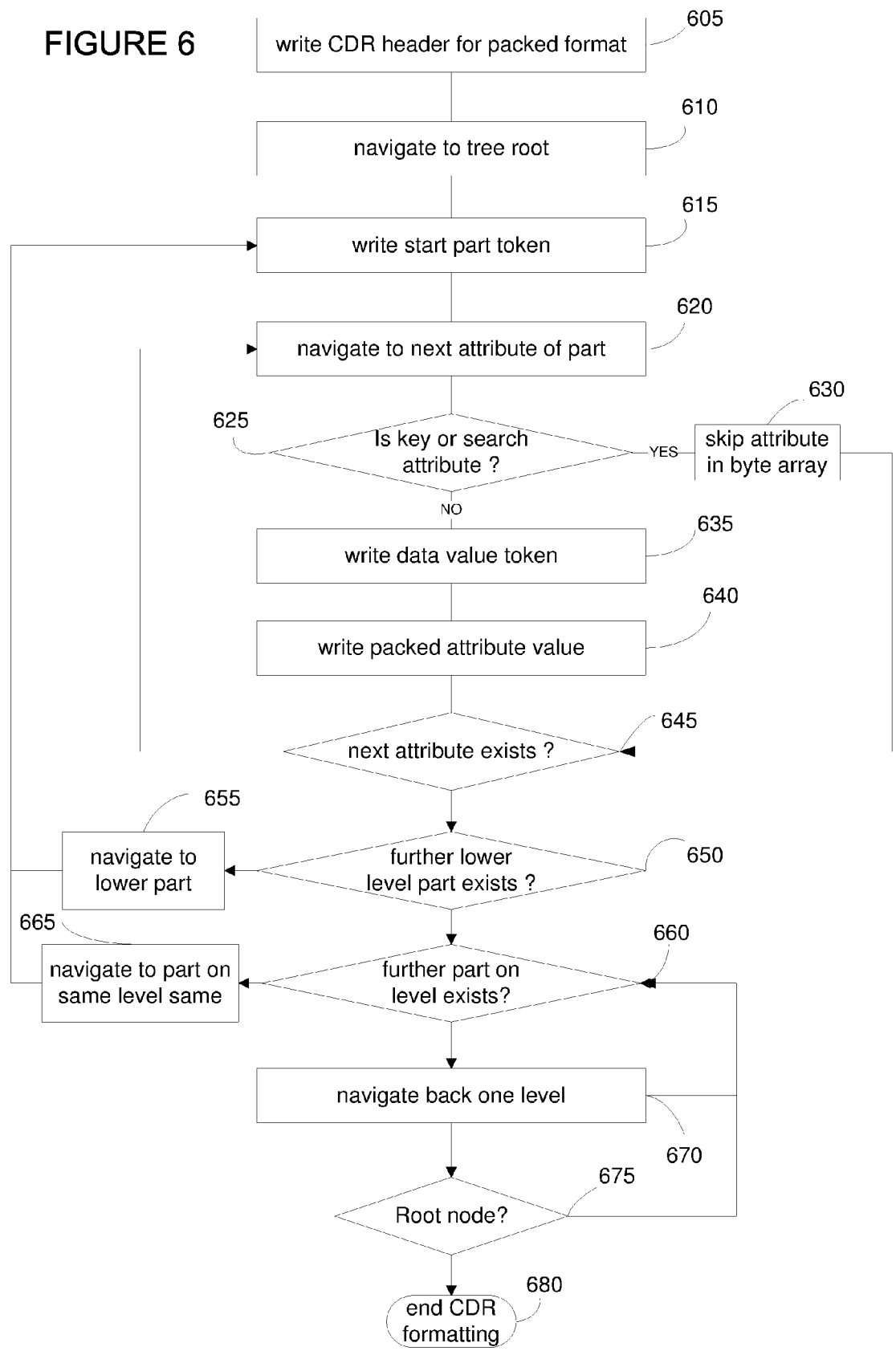

METHOD AND APPARATUS FOR STORAGE OF DATA RECORDS

TECHNICAL FIELD

The present invention relates to storage of data records and more particularly to a method and apparatus for storage of data records.

BACKGROUND

Call or Charging Data Records (CDR) collected from network elements are rated and charged in appropriate components of a business support system (BSS). While being processed in rating these records are enriched with subscriber specific information and also information about the services used, the charges calculated and the discounts applied. After rating and charging the records need to be stored in operational data storage before they are invoiced at the end of the billing period, usually a month.

During the invoicing process all CDRs applicable to the billing time frame are retrieved from persistent storage. If promotions and billing time discounts are applied to CDRs during this process, the CDR gets enriched with promotion and discount information and stored back again.

The rated and discounted records are also visible from customer care and self-care components.

CDRs collect all information related to the usage of one more services during the call and the associated pricing and discounting. For this reason CDRs are natively structured as trees with branches for various services used and all pricing components.

CDRs have to be made persistent for several reasons. On one hand they have to be available for the billing and customer care. On the other hand they have to be forwarded to data analytics components for reporting issues.

A typical distribution of storage demands is 5-10% for customer care data, 10-20% for bill images and the remaining 75% for usage data records, which are the rated and charged call detail records.

Current storage implementations foresee to store the CDRs in a relational database system. As a first step the storage model reflects the tree structure in a normalized relational structure by designing appropriate tables and relationships. In a second step this normalized model is de-normalized for performance reasons leading to information duplication.

Today's telecommunication services have evolved from the plain usage of telephony towards high complex diverse solutions generating a high volume of call data. In order to assure the revenue of an operator requires that potentially anonymized call detail information has to be made persistent over a long period.

BSS systems need to tackle the various issues caused by huge data volume in order to support the different business processes with sufficient performance and latency. This does not only impose requirements on the application software but also on the hardware components participating in this process.

The basic storage concepts for operational call data storage described above lead to various problems:
  High storage consumption due the large number of CDRs and the large size of a single CDR due to the high number of CDR information attributes. The storage size per CDR increases with the complexity of business information stored per call. The de-normalization increases the storage size due to the fact that redundant information needs to be made persistent
  Classic de-normalization solutions are not sufficient to solve performance and latency issues for today's huge amount of CDRs and the high storage size.
  De-normalization leads to consistency issues if updates are performed e.g. during the billing process.
  Operators need to spend significant resources to fulfill the needs of operational CDR data storage for their billing systems. An important cost driver is the huge amount of high performing storage space which has to be provided.

BRIEF DESCRIPTION OF THE DRAWINGS

FIG. 5A-D shows flowcharts for creating and storing a serialized charging record in a database.

FIG. 6 shows a flowchart for formatting a charging record into a payload body field.

SUMMARY

Figure 1:
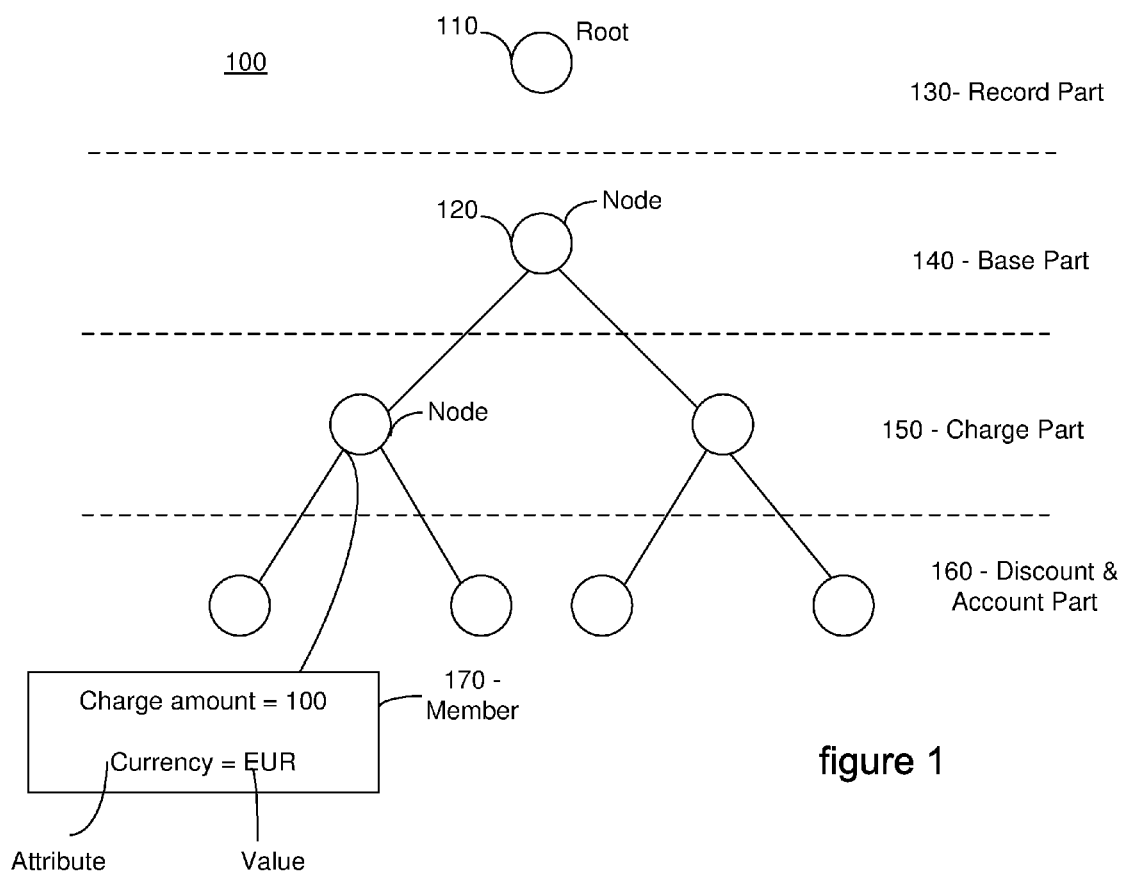
FIG. 1 is a diagram showing the data structure of a CR having a tree structure in memory

It is an object of the invention to provide a method and apparatus for creating a serialized charging record and a hierarchical charging record formatted for insertion into a charging database mitigating the problems of prior art solutions.

One aspect of the invention relates to a method for creating a serialized charging record formatted for insertion into a charging database. The method comprises receiving a hierarchical charging record comprising part nodes with charging related data. A hierarchical charging record configuration definition specifying the data structure of the hierarchical charging record and a charging database configuration definition is retrieved.

The method further includes traversing the hierarchical charging record and for each part node of said hierarchical charging record identifying an attribute of the part node and determining if said attribute is a key attribute or a search attribute and if affirmative storing an attribute value of said attribute in a field of the serialized charging record based on the charging database configuration definition.

A part segment comprising the attribute value and a data value token is stored in a payload body field of the serialized charging record with a part node indicator representing the location of the part node in the hierarchical charging record based on the hierarchical charging record configuration definition.

It is an advantage of the invention that a serialized charging record may be stored in one storage entity such as a table row whereas in storage solutions prior to the invention normally multiple storage entities are needed.

In another aspect the invention relates to a method for creating a hierarchical charging record. The method comprises receiving a serialized charging record comprising part segments with charging related data and retrieving a hierarchical charging record configuration definition specifying the data structure of the hierarchical charging record.

A payload body field is extracted from the serialized charging record and the payload body field is traversed. The traversing includes detecting a part node indicator identifying a part node; allocating memory for the part node determined by the hierarchical charging record configuration definition based on the part node indicator; detecting a data value token indicating a part segment; extracting properties from the data value token; allocating memory for an attribute of the part node, based on the properties; reading a data value from the part segment; and storing the data value to the memory allocated for the attribute of the part node.

Yet another aspect of the invention relates to a data access unit for creating a serialized charging record formatted for insertion into a charging database.

The data access unit comprises an interface unit adapting the data access unit for receiving a hierarchical charging record comprising part nodes with charging related data, retrieving a hierarchical charging record configuration definition specifying the data structure of the hierarchical charging record and retrieving a charging database configuration definition;

The data access unit further comprises a formatting unit adapting the data access unit for traversing the hierarchical charging record and for each part node of said hierarchical charging record identifying an attribute of the part node and determining if said attribute is a key attribute or a search attribute and if affirmative storing an attribute value of said attribute in a field of the serialized charging record based on the charging database configuration definition.

The interface unit is further adapting the data access unit for storing a part segment comprising the attribute value and a data value token in a payload body field of the serialized charging record with a part node indicator representing the location of the part node in the hierarchical charging record based on the hierarchical charging record configuration definition.

Yet a further aspect of the invention relates to a data access unit for creating a hierarchical charging record formatted for insertion into a charging database.

The data access unit comprises an interface unit adapting the data access unit for receiving a serialized charging record comprising part segments with charging related data and retrieving a hierarchical charging record configuration definition specifying the data structure of the hierarchical charging record.

The data access unit further comprises a formatting unit adapting the data access unit for extracting a payload body field from the serialized charging record and traversing the payload body field.

The traversing includes detecting a part node indicator identifying a part node; allocating memory for the part node determined by the hierarchical charging record configuration definition based on the part node indicator; detecting a data value token indicating a part segment; extracting properties from the data value token; allocating memory for an attribute of the part node, based on the properties; reading a data value from the part segment; and storing the data value to the memory allocated for the attribute of the part node.

Embodiments of the invention will now be described in more detail with reference to the enclosed drawings.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

In particular, whenever the term charging, or call, data/detail record (CDR) is used, this should be understood to apply equally well to any charging record (CR)—including any data record carrying charging data such as call data, session data or event data, such as for example an event data record (EDR).

The solution relates to a new optimized storage model for data records, such as charging records. This storage model lifts the limitations of the traditional de-normalization approach by applying a completely different storage model.

The solution consists out of the following parts:

A byte array representing a serialized charging record having a tree structure in memory.

An algorithm which creates the byte array representation for a CR. The algorithm serializes the CR by converting the data structure, e.g. tree, into a format that can be stored (for example, in a relational database, a hbase database, a file or memory buffer, or transmitted across a network connection link) and reconstructed later in the same or another computer environment.

A storage model for CRs in a database, such as a relational database, using the byte array representation.

Storing the complete CR efficiently in a single row in a database, such as a relational database.

Thus, a CR structured as a tree in computer memory is serialized and may further be condensed and compressed into a byte array thus avoiding redundancies. Condensation is performed by coding the data value of each attribute into a condensed format dependent on the type and data size of the data to be coded. Compressing is performed by applying a compression algorithm to the byte array without relying of information about the included data types. The format used to create the byte array is a platform agnostic key/value format enriched with tokens to reflect the tree nodes. The format is designed to be aware of data type and size for number, string and date types of the fields contained in the CR. Type specific algorithms are applied to condense single attribute values. The serialized charging record is stored in a single row of a database table and contains a column for the byte array represented as a binary array such as for example a Binary Large OBject (BLOB) and a few key columns for CR identification, search and retrieval.

For one CR one single row is created on data upload. This CR can easily be updated by retrieving the table row, reformatting and overwriting the byte array, e.g. BLOB, column.

The access to the data is implemented by a search and query mechanism using a two-step approach. Each search query is divided into conditions which are applicable to the key columns and therefore can be evaluated by the initial database retrieval step (worked off by e.g. a Relation DataBase Management System (RDBMS) Structured Query language (SQL) engine) and a second set of conditions which filter the result set after de-serializing, i.e. the opposite operation where the CR is recreated by extracting the data structure, e.g. tree from the byte array.

The details of the persistence layer including format and access methods may be shielded from the application using the data by providing appropriate data layer implementations in C++ and java libraries.

The byte array format foresees the option to include further external real time compression algorithms and apply them to the data array. If such an external algorithm has been applied, the byte array is flagged appropriately.

Sample data layer implementations provide offer plug-in functionality, which allows invoking compress and uncompressing methods on the byte array when creating or retrieving the serialized charging record (e.g. database row).

Embodiments of the invention will now be described with reference to the appended drawings.

FIG. 1 is a diagram showing the data structure of a charging record having a tree structure in memory.

The naming convention for the different components of a CR structure in memory indicated below is not intended to limit the invention but merely established for describing the involved terminology.

A call detail record in memory may be natively structured as a tree, 100, having branches for various information about service usage, charges calculated, discounts applied and so on.

A tree is a specific type of network topology, where a root node 110 being the single node on the upmost level of a tree is connected to one or more nodes 120, being one level lower in the hierarchy. Second level nodes may be connected to one or more nodes being one level lower in the hierarchy. A connection between an upper level node and a node being one level lower is denoted a parent-child relationship. There are parent-child relationships with one child having one unique parent allowed in a tree topology.

A part is refers to a node or nodes on a specific level in a tree structure also associated with a business meaning.

The Record Part, 130, is the upper most node level of a tree structure (level 1) of a CR, carrying the information of a call detail record common to all further branches in the tree, e.g. unique identifier of the CR. On the second level of tree structure of the CR is the Base Part 140 carrying the information about usage of a specific service during the call. The Charge Part, 150, is the third node level of tree structure of CR carrying the information about charges related to the service mentioned in the parent node (base part). On the fourth node level of tree structure of CR is the Discount & Account Part 160, carrying the information about discounts applied to charges mentioned in the parent node (charge part) and account changes.

Members, 170, are first level structures used to specify a collection of associated properties of nodes of a part (e.g. charge amount and currency). A node has a set of named structures known as members. Each of the named structures/members has a set of attributes. An attribute is a part of a named structure/member, which in turn is part of a node. An attribute is the name of a specific property included in a member and having a value. An example is a Charge Part having a member for the charge having the attribute "Charge amount" with the value 100, and a "Currency" attribute having the value EUR.

Figure 2:
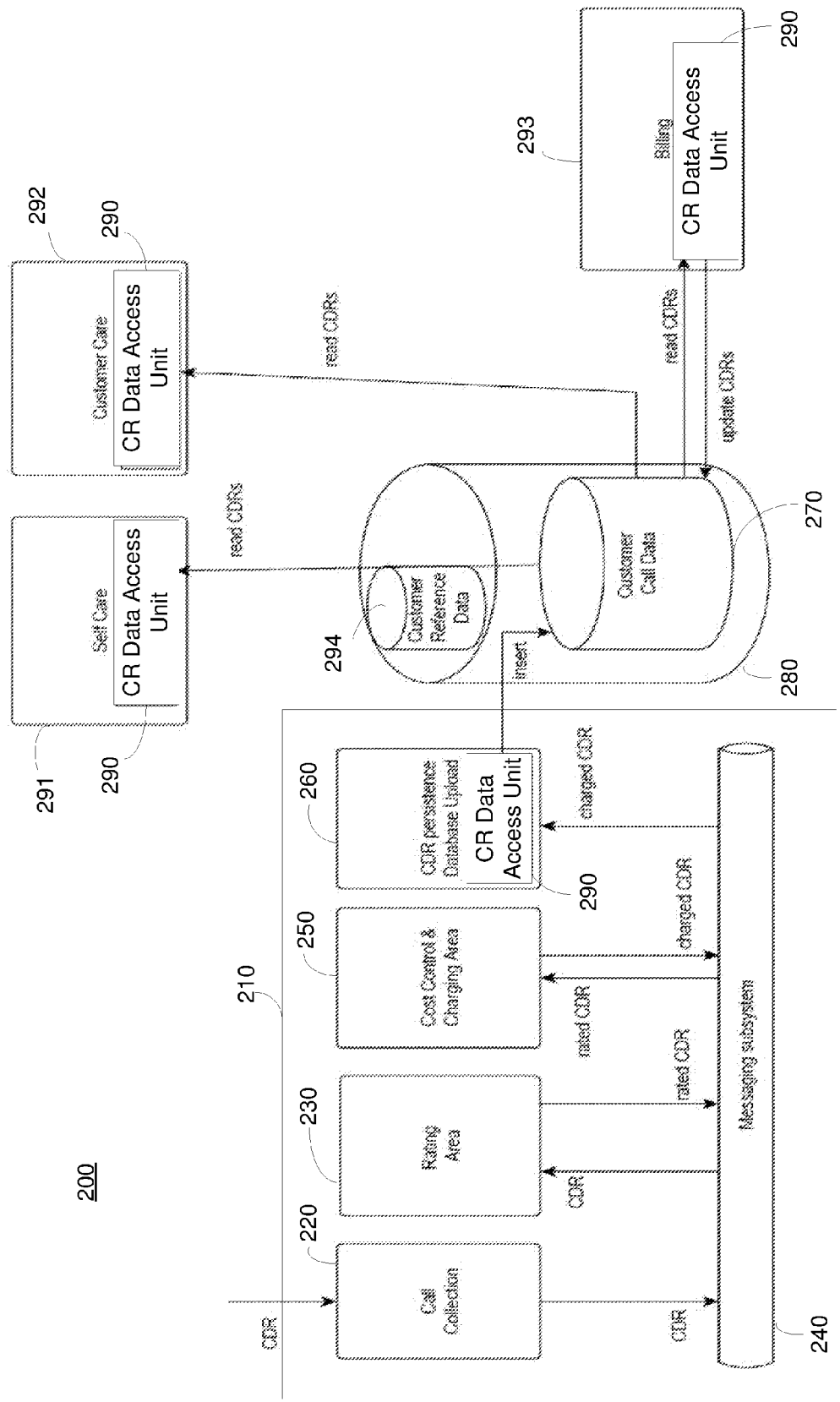
FIG. 2 is a block diagram showing an overview of a billing system in the context of a full Business Support System wherein the invention may be useful.

FIG. 2 is a block diagram showing an overview of a billing system comprising Rating and Charging 210 and Billing Unit 293, in the context of a full Business Support System 200 wherein the invention may be useful.

CRs are received by a Call Collection Unit (CCU) 220 and forwarded to a Rating Area Unit (RAU) 230 via a Messaging Subsystem (MSS) 240. The RAU rates the CR and forwards the rated CR via the MSS to a Cost Control and Charging Area Unit (CCCAU) 250 which for example calculates real time discounts, enforces spending control and charges to accounts. The CCCAU performs charging on the customers account and forwards the charged CRs to the CR persistence Database Upload Unit (CDUU) 260 which performs serialization of the CR to prepare it for insertion into a Charge Record Database (CRDB) 270 of the Master Database (MDB) 280, using a CR Data Access Unit (CDAU) 290.

The MDB may also include a Customer Reference Database 294.

Subscribers may be allowed to access relevant charging data via a Self-care Unit (SCU) 291 wherein a CDAU is arranged to provide read access to data of the CRDB.

Similarly, the operator's customer care may access relevant charging data via a Customer care Unit (CCU) 292 wherein a CDAU is arranged to provide read access to data of the CRDB.

Further, the Billing Unit 293 may access and update relevant charging data wherein a CDAU is arranged to provide read access to data of the CRDB for read, deletion and update/change.

Figure 3:
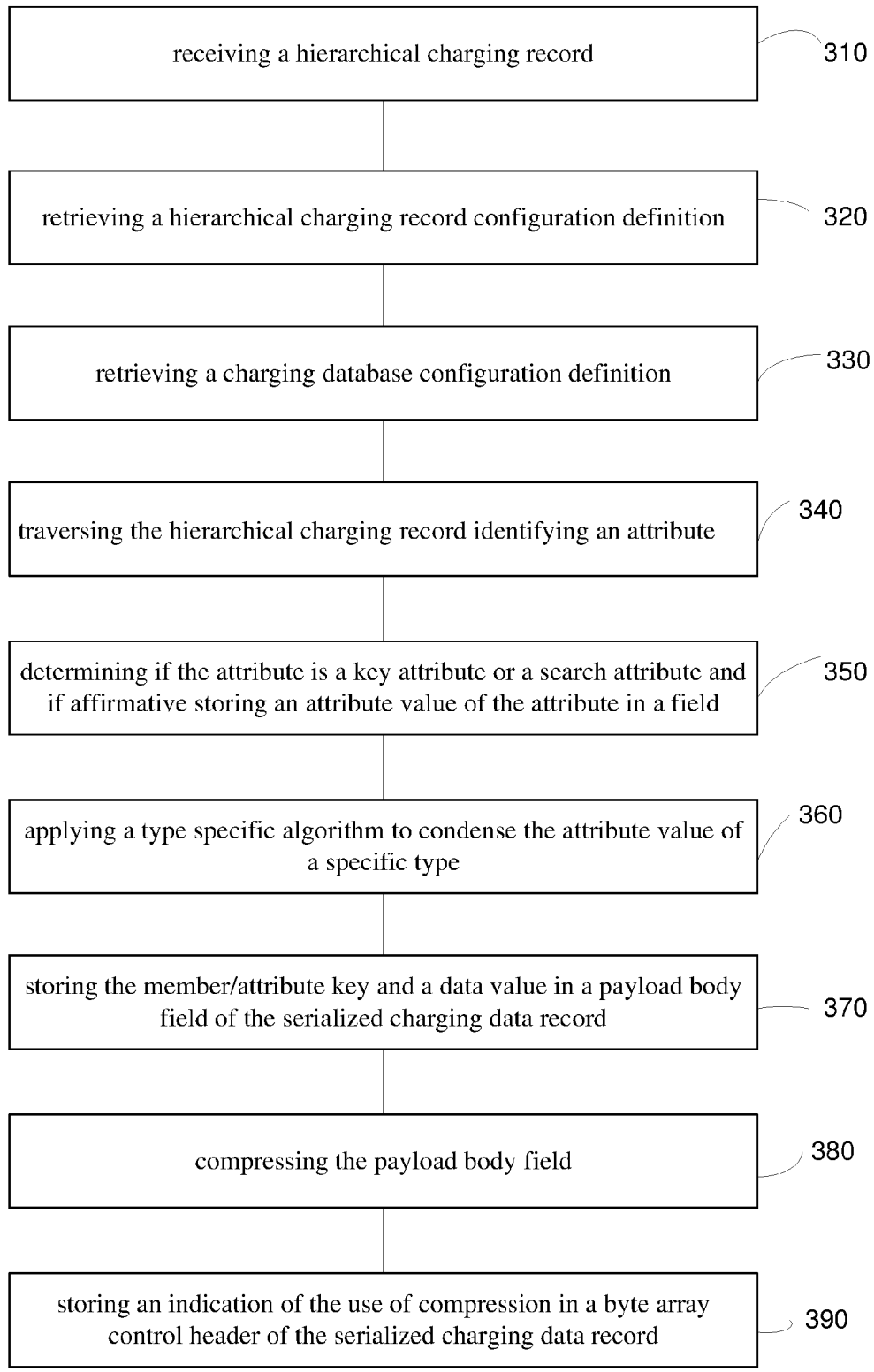
FIG. 3 is a flow chart showing a method for creating a serialized charging record formatted for insertion into a charging database.

FIG. 3 is a flow chart showing a method for creating a serialized charging record formatted for insertion into a charging database.

A hierarchical charging record comprising part nodes with charging related data is received in step 310. In step 320 a hierarchical charging record configuration specification definition specifying the data structure of the hierarchical charging record is retrieved and a charging database configuration definition is retrieved in step 330.

The hierarchical charging record is traversed in step 340 and for each part node of the hierarchical charging record an attribute of the part node is identified by processing the collection of member-attribute tuples present in this part node in a sequence.

In step 350 it is determined if the attribute is a key attribute or a search attribute and if affirmative an attribute value of the attribute is stored in a field of the serialized charging record (corresponding to the key or search attribute) based on the charging database configuration definition.

In step 360 a type specific algorithm is optionally applied, if the attribute is a not a key or search attribute which will be stored separately, to condense the value of an attribute of a specific type in order to save storage space. Such type specific algorithms may include for example that an integer (INTEGER) type attribute value is condensed by representing the attribute value with an n-byte integer type where n is smallest number of bytes sufficient to represent the attribute value; and/or a double precision float (DOUBL) type attribute value is condensed by omitting trailing zero bytes and setting the size of the attribute value in the first used byte; and or a date (DATE) type attribute value is condensed by masking each byte of the date attribute value to obtain a half byte constituting a date character and pair wise concatenating the obtained half bytes.

A part segment comprising of a data value token (i.e. a member/attribute key) and the attribute value (i.e. the data value) are stored in a payload body field of the serialized charging record with a part node indicator representing the location of the part node in the hierarchical charging record in step 370, based on the hierarchical charging record configuration definition. The payload body field may be a Binary Large OBject (BLOB) i.e. a collection of binary data to be stored as a single entity in a database management system. Also an ASCII format is possible where the body could also be a large ASCII string (CLOB).

To save storage space, if the attribute is a key attribute or a search attribute which has already been stored in a field of the serialized charging record and may thereby be omitted from storage in the payload body field. In step 370, the storing of the attribute value (i.e. data value) and the data value token (i.e. member/attribute key) in the payload body field of the serialized charging record may therefore, as an option, be performed only if the attribute is not a key attribute or a search attribute.

Thereby, the byte array will not contain the key attributes and search attributes which are configured to be stored in separate table columns, such that they are accessible via SQL statements executed for example from billing or customer care applications.

that is used, if several are possible. This has the advantage of producing a complete CR with all necessary information when uncompressing the byte array/BLOB of a complete CR.

One CR will be stored in one table row whereas in storage solutions prior to the invention normally multiple rows are needed depending on the number of leaves of the CR tree.

The serialized charging record will thereby contain key columns, search columns, and the byte array (e.g. BLOB) column containing the formatted CR.

A sample table structure is depicted in the table below. This table structure is the result of a database configuration definition. The definition of the database structure refers to the definition of the record structure and identifies which member/attributes will be made persistent.

| Column Name | Data Type | Key/Search/Blob | Comment on Column |
| --- | --- | --- | --- |
| CUSTOMER_ID | INTEGER | Search | Internal customer identifier |
| CONTRACT_ID | INTEGER | Search | Internal contract identifier |
| INITIAL_START_TIME_TIMESTAMP | DATE | Search | Call start date and time (UTC) |
| RECORD_ID_CDR_ID | INTEGER | Key | Call record identifier |
| CREATE_DATE_TIMESTAMP | DATE | Search | Record creation date and time |
| CUST_INFO_BILL_CYCLE | VARCHAR2(2) | Search | Billing cycle |
| SERVED_PARTY_NUMBER | VARCHAR2(100) | Search | Served party address |
| OTHER_PARTY_NUMBER | VARCHAR2(100) | Search | Other party address |
| INITIAL_START_TIME_TIME_OFFSET | INTEGER | Search | Offset of call start time against UTC |
| ORIG_ENTRY_DATE_TIMESTAMP | DATE | Search | Original record entry date and time (rerating) |
| CDR_BLOB | BLOB | Blob | Binary object storing a complete CDR (eventually compressed) |

The payload body field may optionally be compressed in a step 380 by using a compression algorithm to further reduce storage space. The compression is advantageously a lossless data compression algorithm.

An indication of the use of a compression algorithm, or an indication of which compression algorithm if several are possible to use, may be stored in a byte array control header of the serialized charging record in step 390. The byte array control header is prefixing the BLOB and maybe stored together with the BLOB in the same database column.

Figure 4:
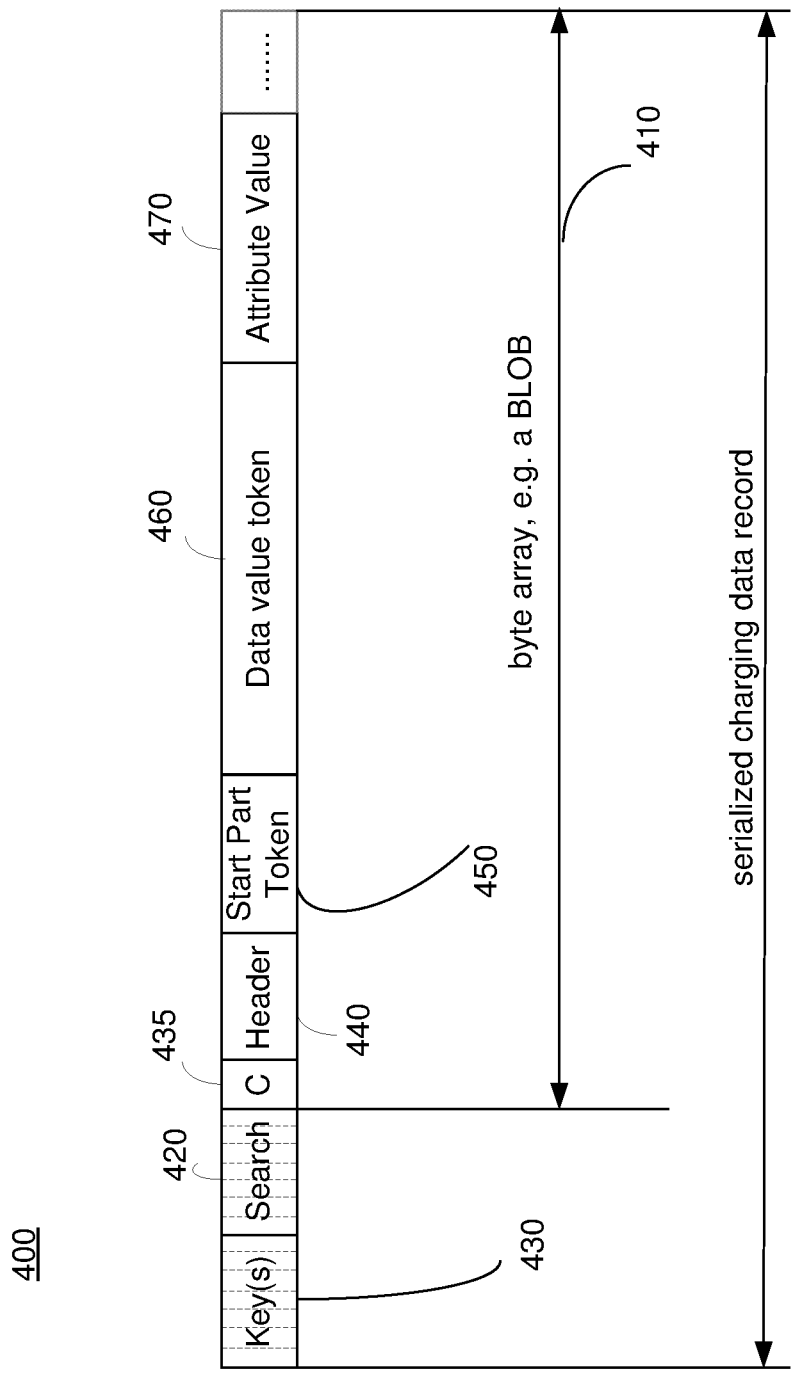
FIG. 4 is a diagram showing the data structure of a serialized charging record.

FIG. 4 is a diagram showing the data structure of serialized charging record.

The payload body field 410 is a byte array that may be implemented using a BLOB (Binary Large OBject) which is a type of database column, which can be used to store byte arrays, or a Character Large Object (CLOB). Such a type of database column is provided by most popular relational or hbase database systems.

With this column type it is possible to store CRs, optionally condensed binary formatted, and optionally compressed, in one column, so that it is no longer necessary to associate a CR attribute to a dedicated table column. Using this concept the number of table columns can be reduced to this byte array (e.g. BLOB) column plus the number of attributes needed for a condition clause of a dynamic read statement, e.g. WHERE clauses of a SQL statement of the selection, i.e. search columns 420, and to define a key 430. The key can also be a combined key made out of several attributes/parts.

The payload body field will further include a byte array control header field 440. If compression is used, a Compression header 435 may be affixed, i.e added to the beginning or end, to the payload body field to indicate a compressed CR and also indicating which compression method The binary format is an array of bytes, which contains information, optionally condensed and/or compressed, of all parts of the CR tree.

Control information is structured into tokens, which are special bit sequences.

There are three kinds of tokens:
special tokens
start part tokens
data value tokens.

The control information in the byte array control header 440 consists out of special tokens only.

Special tokens define additional information, e.g. the byte order for integer values (low endian, big endian) or an external compression method. The format is fixed and contains a special token indicator, a special token length, a special token type and the special token body.

Further control information in the body 410 is either related to the tree structure where it is a Start Part Token 450, or related to an attribute, in which case it is a Data Value Token 460.

The control information does not exist in the original CR but is added during formatting the CR onto the byte array and creating the serialized data record.

Each part of the call detail record (node at a certain level with business meaning associated to it) is identified by a so called part identity (part id). Start Part Tokens are used to flag the tree structure in the serialized charging record. The Start Part Token contains a token indicator which is a special bit sequence indicating start of part, and a token value which is the part identity.

Data value tokens define values for the current part. The format depends on the data type and size of the transmitted values and contains key, length and value type information.

As an illustrative example, Member/Attribute is 10/9 for the member S_P_NUMBER and attribute ADDRESS where the Attribute Value is 555706950003 (length 12). The following table shows a data value token for such member/attribute.

| | | | |
|---|---|---|---|
| Bit 7 | 1 = marks this byte as data value token | Example:<br>Member/Attribute:<br>10/9:<br>S_P_NUMBER/ADDRESS<br>Value will be:<br>555706950003<br>(length 12) | 1 |
| Bit 6 | 1: Member id is the same as in the last data value token<br>0: new Member id is given in format as defined by bit 5 | Bit6:0—new Member id 10 (<255) | 0 |
| Bit 5 | 1: Member id is greater than 255: the next two bytes contain it<br>0: Member id is given in the next byte | Bit5:0—new attrib id 9 (<255) | 0 |
| Bit 4 | 1: attribute id is greater than 255: the next two bytes contain it<br>0: attribute id is given in the next byte | Bit4:0 | 0 |
| Bit 3-0 | For bit 3-0, if data type is:<br>STRG and the string length is <16: length<br>DATE: 8 or 14 or 4 or 7 (length of date string)<br>STRG and the string length is >16: Value 0 and the two byte after member and attribute id contain the length<br>Numeric: length of the numeric type (1, 2, 4, 8)<br>CHAR: (ASCII character length) 1 | Bit3:1 lenght 12 = 1100 | 1 |
| Bit 2 | | | 1 |
| Bit 1 | | | 0 |
| Bit 0 | | | 0 |
| Byte 2 | Member id is 10 (dec) = 1010<br>No other byte is needed for the id | | 00001010 |
| Byte 3 | Attribute Id is 9 (dec) = 1001<br>No other byte is needed for the id | | 00001001 |

The resulting data value token is therefore 10001100 00001010 00001001.

The data bytes are stored in a length as defined below when using condensed mode:

For INT8 (1-byte integer), INT16 (2-byte integer), INT32 (4-byte integer) and INT64 (8-byte integer) the integer values are coded in the smallest possible size (e.g. a value of 13 is always coded as INT8—a value of 0 is coded with size 0 in the first byte).

For DOUBL (double precision float, 0-8 bytes), in condensed mode trailing zero bytes of double values are omitted and the size in the 'first byte' is set accordingly.

Characters are stored as one (or more) bytes depending on the character set. Strings are stored as sequence of characters, each character a one (or more) bytes.

For DATE (date in 8 or 14 or 4 or 7 bytes), the date values are formatted in two formats i.e.
Short (8 Bytes): YYYYMMDD, e.g. 20091213
Long (14 Bytes): YYYYMMDDHHMMSS, e.g. 20091213113000

For condensed mode date values are formatted in the formats:
Short (4 Bytes): CYMD e.g. 0x20091213
Long (7 Bytes): CYMDHMS e.g. 0x20091213113000

The format compresses two printable characters into a single byte each, by masking with 0x0F and putting the two half-bytes together:

| Char | 2 | 0 | 0 | 9 | 1 | 2 | 1 | 3 |
|---|---|---|---|---|---|---|---|---|
| Hex | 32 | 30 | 30 | 39 | 31 | 32 | 31 | 33 |
| Hex | 20 | | 09 | | 12 | | 13 | |

FIG. 5A-D shows flowcharts for creating and storing a serialized charging record in a database.

The call detail record structure in memory needs to be converted into a byte array in order to be persisted in a database row.

The content of the byte array depends on the configuration of the target database table used for storing the call detail records. Key and search attributes like a unique call record id or customer or contract identifiers can be omitted from the byte array representation in order to save storage space.

After having formatted the call detail record onto the serialized and optionally condensed byte format further external compression algorithms applicable to byte streams can be applied, preferably using an algorithm feasible for real time execution. The resulting byte array will be prefixed by a one byte control information header about the compression algorithm applied. This information is stored in the database together with key and search columns and the byte array containing the payload of the call detail record.

When retrieving the call detail record later during billing, the control information about potential external compression is evaluated and the method for uncompressing the byte array is applied.

Thus CRs with or without external compression can exist simultaneously in the same storage.

The methods for storing and retrieving call detail records can advantageously be implemented in a dedicated data access layer which shields the application from the persistent storage.

According to the method shown in FIG. 5A, two generic preparation actions are executed once and are initiated for example by an external configuration in step 505. The first generic preparation action is retrieving the configuration definition of the hierarchical charging record which is specifying the data structure of the CR in memory (preliminary setup step) in step 510. The configuration definition contains the (list of) nodes for each configured tree structure, the hierarchy between the nodes, the members with their attributes the attribute specification consisting out of data type and maximal length (if applicable) and the association of members to nodes. The second generic preparation action is retrieving the configuration definition of the charging database in step 515 in order to determine which attributes from the root part of the CR are used as key columns and search columns in the target table of the relational database.

FIG. 5B shows the following steps to describe the workflow for storing a CR.

In step 520 the retrieved configuration definitions are used to format CR tree into a byte array, e.g. a BLOB.

The configuration of the charging database definition is checked in step 525 to determine whether to apply any external compression algorithm.

If external real-time capable external compression algorithm is to be applied, plug-in function is invoked in step 530 to compress the byte array and the control information in the byte array control header is updated accordingly in step 535 with information about external compression algorithm and optionally which compression algorithm that is used (if several are possible).

Figure 5C:
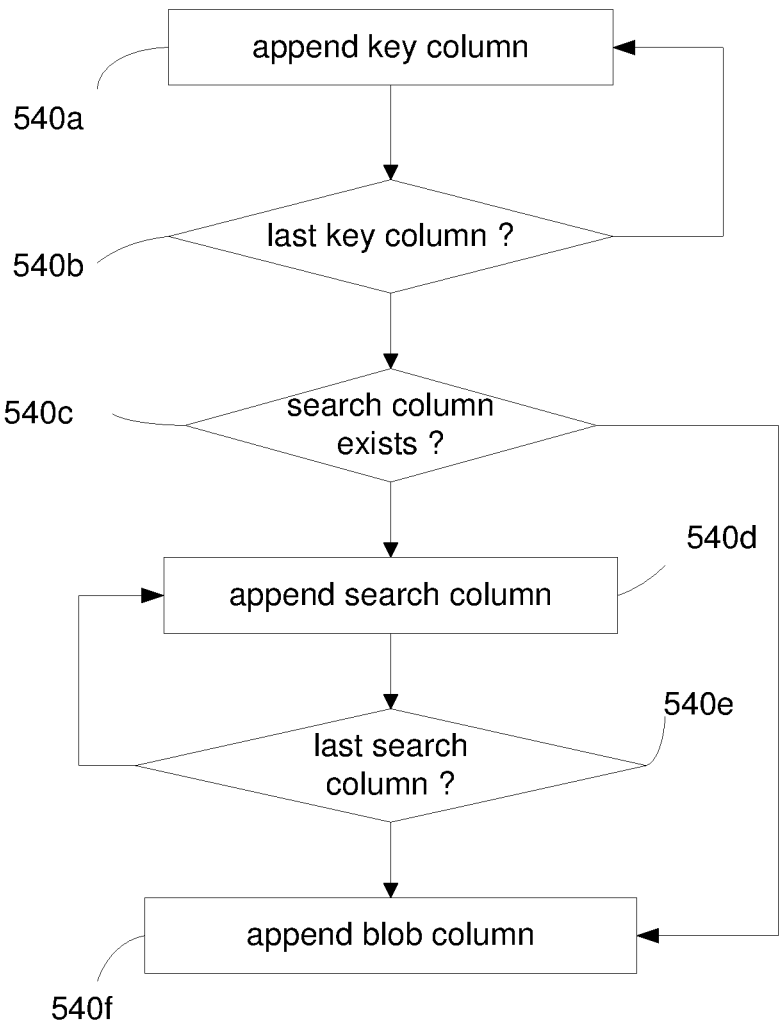

For the purpose of dynamic Structured Query Language (SQL), i.e. a SQL statement that is constructed and executed at program execution time, a prepare insert statement action for a database row is executed in step 540, further detailed in FIG. 5C.

According to FIG. 5C the prepare insert statement action comprises the sub-step 540a and 540b to append all key columns as indicated by the charging database configuration definition.

In step 540 all search columns as indicated by the charging database configuration definition are appended by the sub-step 540c checking if search columns exists, if affirmative appending the search column in step 540d and checking in step 540e if the appended search column was the last or if further shall be appended. Further, step 540 comprises sub-step 540f to append the byte array, e.g. blob column.

Figure 5D:
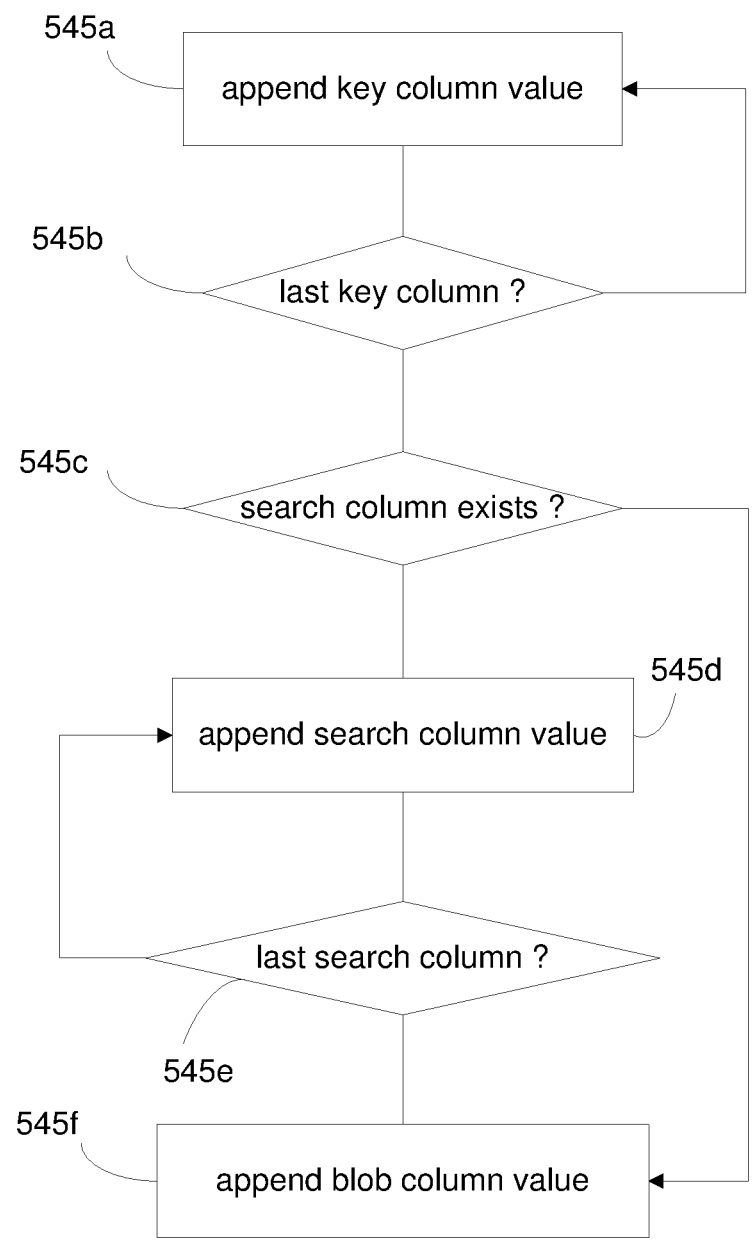

In step 545 append value clauses are executed, which is further detailed described in FIG. 5D. Step 545 comprises sub-steps 545a and 545b to append all key columns values as indicated by the charging database configuration definition.

Step 545 comprises sub-steps 545c, 545d and 545e to append all search column values as indicated by the charging database configuration definition.

In sub-step 545f the byte array, e.g. blob, column value is appended.

The insert statement is executed in step 550 inserting the serialized charging record into the database.

FIG. 6 shows a flowchart for formatting a charging record into a payload body field.

FIG. 6 depicts the logic to format a call detail record having a tree structure in memory into a byte array optimized by serialization. The step of formatting the CR tree into a payload body field, e.g. byte array, BLOB, will now be described in more detail.

An explanation of the different workflow steps is given below.

The following steps describe the workflow for formatting a CR into a byte array.

In step 605 a byte array is allocated and byte array control header containing one special token is written which specifies the byte order.

The root node of the tree is navigated to in step 610.

A start-part token containing the part identity number is written in step 615. This number has been retrieved from configuration in the first preparation action retrieving the hierarchical charging record configuration definition (preliminary setup step) in step 610.

The next attribute of the part is navigated to in step 620.

In step 625 it is checked whether the attribute is key or search attribute (according to hierarchical charging record configuration definition.

If it is determined in step 625 that the attribute is a key attribute or search attribute, then the attribute is skipped from the byte array as shown by step 630 and the method continue with next attribute of the part in step 645.

If the attribute is not a key or search attribute then a data value token is written to the byte array in step 635, and the attribute value is written in step 640, optionally condensed.

In step 645 it is navigated to the next attribute of the part and if an attribute exists, the method continues with step 620.

If no attribute of the current part exists, it is checked in step 650 whether a further lower level part exists and if lower level part exists, navigate to lower part in step 655 and continue with step 615.

If no lower level part exists, it is checked in step 660 whether sibling part exists. A sibling part is a part on same level having the same parent. If a sibling part exists, navigate to this part in step 665 and continue with step 615.

If no sibling part exists, navigate to parent part (back one level) in step 670.

It is checked in step 675 if parent is the root node and if so the CR formatting is ended in step 680. If the parent is not the root node, it is further check in step 660 whether any sibling part exists.

If no sibling part exists, step 670 is executed to navigate to the parent part.

Figure 7A:
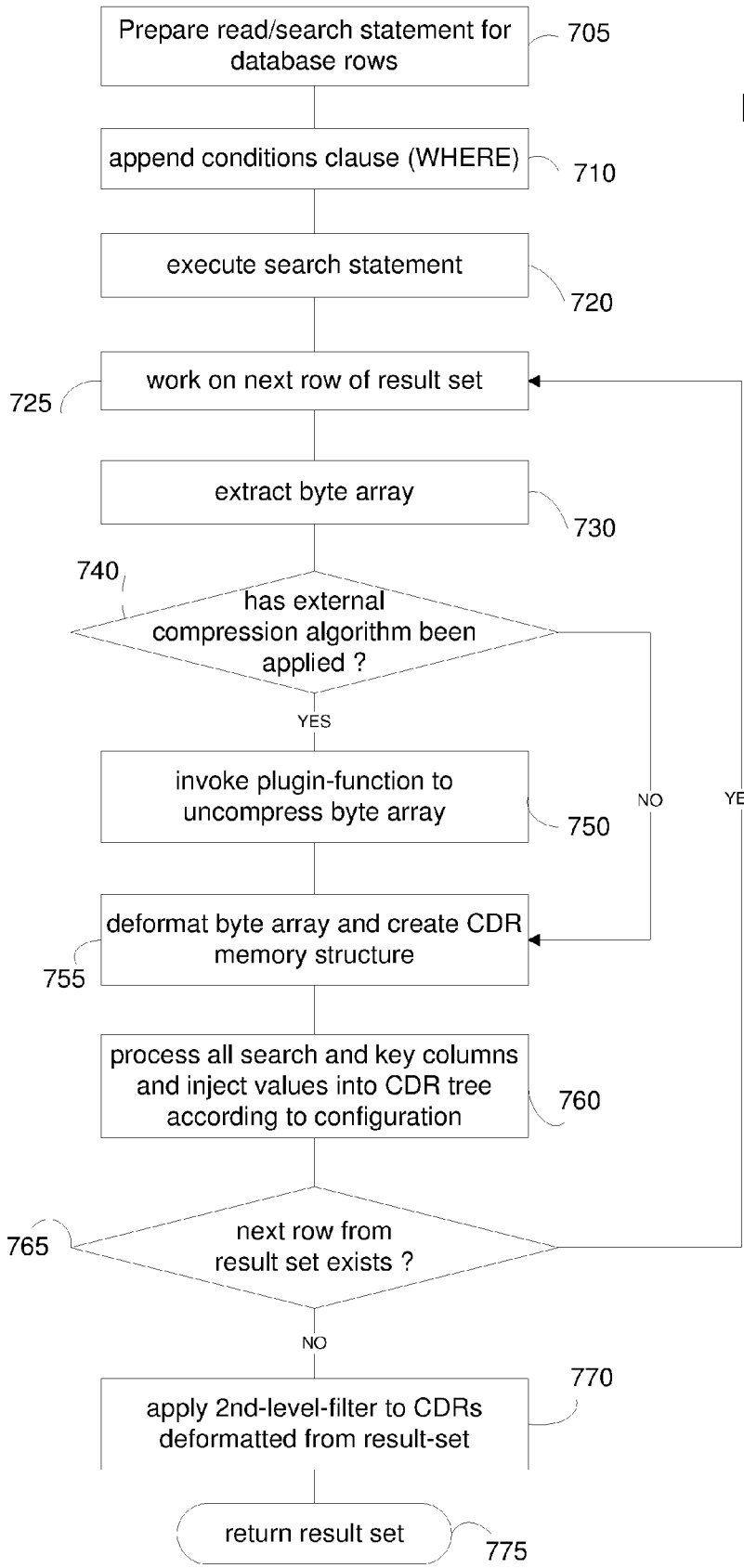
FIG. 7A-C is a flowchart showing the logic to retrieve charging records from a database.
Figure 7B:
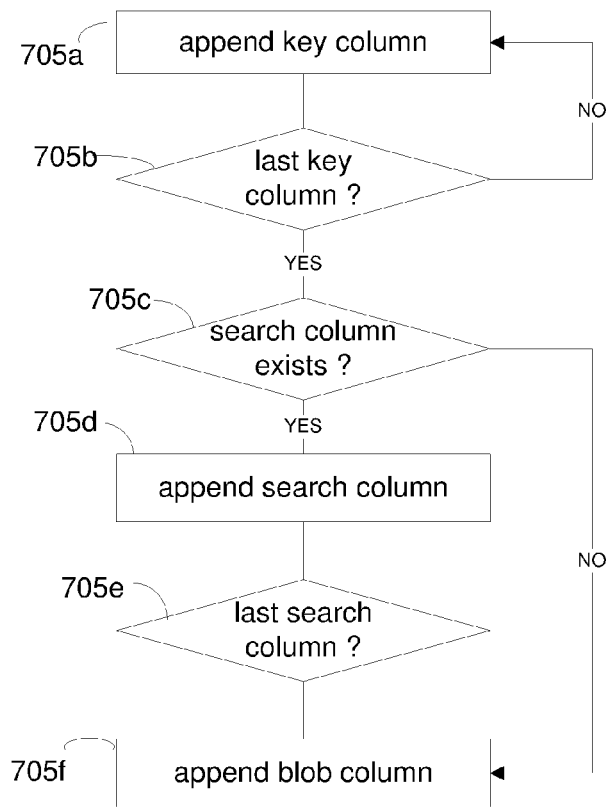
Figure 7C:
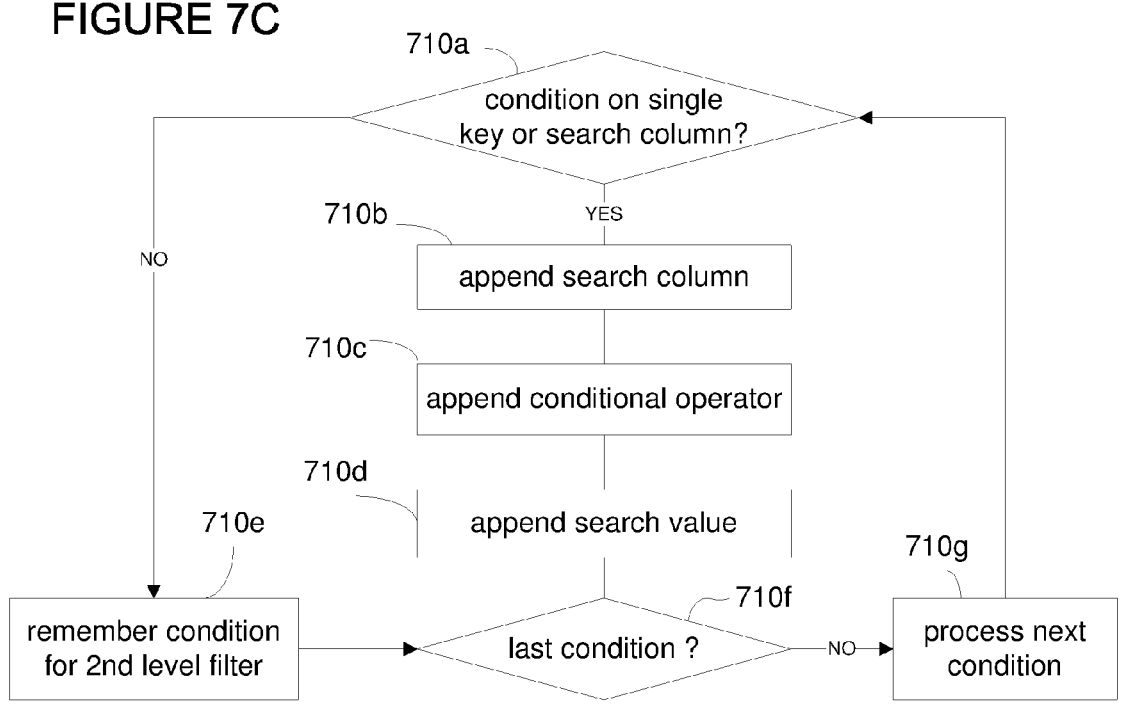

FIG. 7A-C is a flowchart showing the logic to retrieve charging records from a database.

The tree-like memory structure of the CR is rebuild when reading back a CR from the database table. Initially this tree structure is build from the byte array read from the blob column. If key and search attributes have been omitted from the payload body field, a second phase is performed where the attributes, which are stored in separate table columns (key and search columns), need to be re-injected into the CR after it has been de-formatted from the BLOB.

As has already been described in relation to FIG. 5A two generic preparation actions are executed once and are initiated for example by an external configuration in step 505. The first generic preparation action is retrieving the hierarchical charging record configuration definition (preliminary setup step) in step 510. The second generic preparation action is retrieving charging database configuration definition in step 515 in order to determine which attributes from the record part of the CR are used as key columns and search columns in the target table of the relational database.

The following steps then describe the workflow for retrieving CRs.

The method continues in step 705 with preparing select statements for retrieving database rows. This is shown in further detail in FIG. 7B wherein in step 705a-705b all key columns as indicated by the retrieved charging database configuration definition are appended. In step 705c-705e all search columns as indicated by the retrieved charging database configuration definition are appended. Then, in step 705f the byte array/BLOB/CLOB column is appended.

In step 710 the conditions clause (where clause) is appended.

This is shown in further detail in FIG. 7C wherein in step 710a it is for each condition checked whether the condition applies to a key or search column stored separately in the table. If yes, a condition is constructed in step 710b-d from column name, conditional operator and search value and appended to search statement. If no, remember condition for 2nd level filter in step 710e and check if the condition was the last condition in step 710f. If not, process next condition, step 710g. If the condition was the last condition then execute search statement in database in step 720 for receiving a serialized charging record comprising part segments with charging related data.

Start processing result set is performed in step 725 in order to convert the rows retrieved from the database into tree-like CRs in computer memory.

In step 730 the next available row is selected from result set and the payload body field (e.g. binary or ASCII) is extracted.

It is check whether external compression algorithm has been applied in step 740; if so the plug-in function to decompress payload body field from the serialized charging record is invoked in step 750. I.e. a compression token affixed to the payload body field indicating a compression of the payload body field is detected and subsequently uncompressing the payload body field based on the compression token.

De-formatting of payload body field and creation of the CR tree-structure in memory is performed in step 755.

Step 760 is performed to process all search and key columns stored separately and inject values into CR tree structure according to the configuration.

In step 765 it is checked if any further rows in the result set exist, and if so it is continued with step 730.

In step 770 a second level filter is applied to set of CRs de-formatted from the result set of the search statement by that for each CR in the CR set check all conditions remembered from step 710e and by keeping the CR if all conditions match, and discard otherwise.

The result set is finally returned in step 775.

Figure 8:
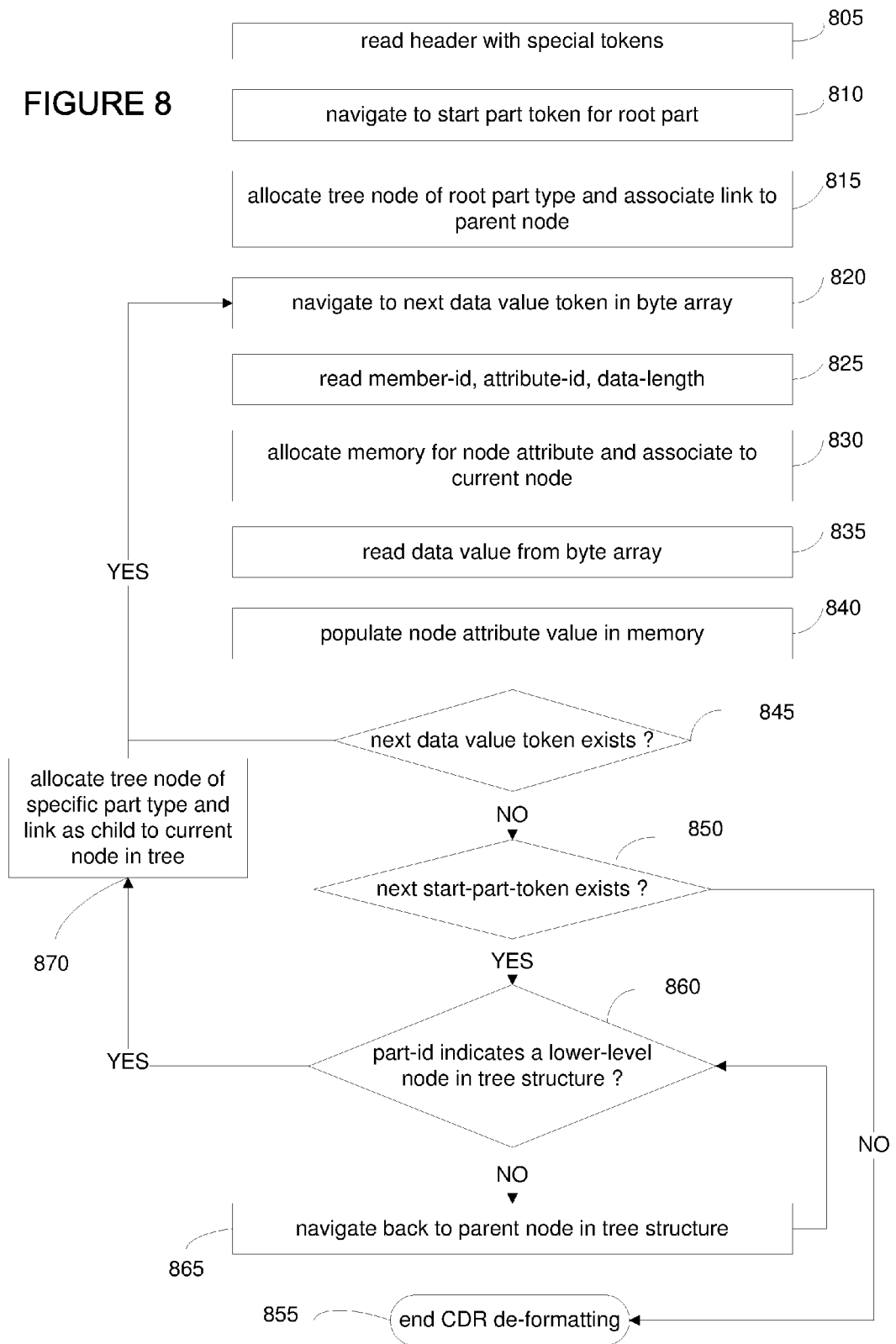
FIG. 8 is a flowchart showing the logic to de-format a byte array having a data structure described in FIG. 4 and create a call detail record in memory having a tree structure.

FIG. 8 is a flowchart showing the logic to de-format a byte array having a data structure described in FIG. 4 and create a call detail record in memory having a tree structure.

The following steps describe the workflow for de-formatting a byte array and creating a CR in memory.

The byte array control header containing special tokens is read in step 805. In step 810 a part node indicator identifying a part node is detected in that it is navigated to the start-part-token for the root part in the byte array.

Allocating memory for the part node determined by the hierarchical charging record configuration definition based on the part node indicator is done in step 815. Allocation of a tree node according to specified part identity number is performed (the number-node type relation has been retrieved from the hierarchical charging record configuration definition, and linking of this new tree node to parent node in memory if it is not the root node.

It is navigated to the next data value token in the byte array in step 820 detecting a data value token indicating a part segment.

In step 825 properties such as member and attribute and data length are extracted, e.g. read.

Memory for node attribute is allocated and associated to current node in step 830 based on the properties. Data value from the part segment of the byte array are read according to specified data length in step 835 and population of node attribute value by storing in memory is done in step 840. In step 845 it is checked for the next data value token in the byte array. If a data value token exists, go to step 820, otherwise continue with step 850 and check whether further start-part tokens exist. If no further start-part tokens exist, end CR creation in step 855. Otherwise, if further start-part-token exists then check in step 860 whether part-identifier indicates a lower level node in the tree structure. If part corresponds to lower level node for current node as indicated by the hierarchical charging record configuration definition then allocate tree node of specific part type and link as child to current node of tree in step 870 and go back to step 820. If part does not correspond to lower level part, navigate back to parent node in tree structure in step 865 and then perform step 860.

Figure 9:
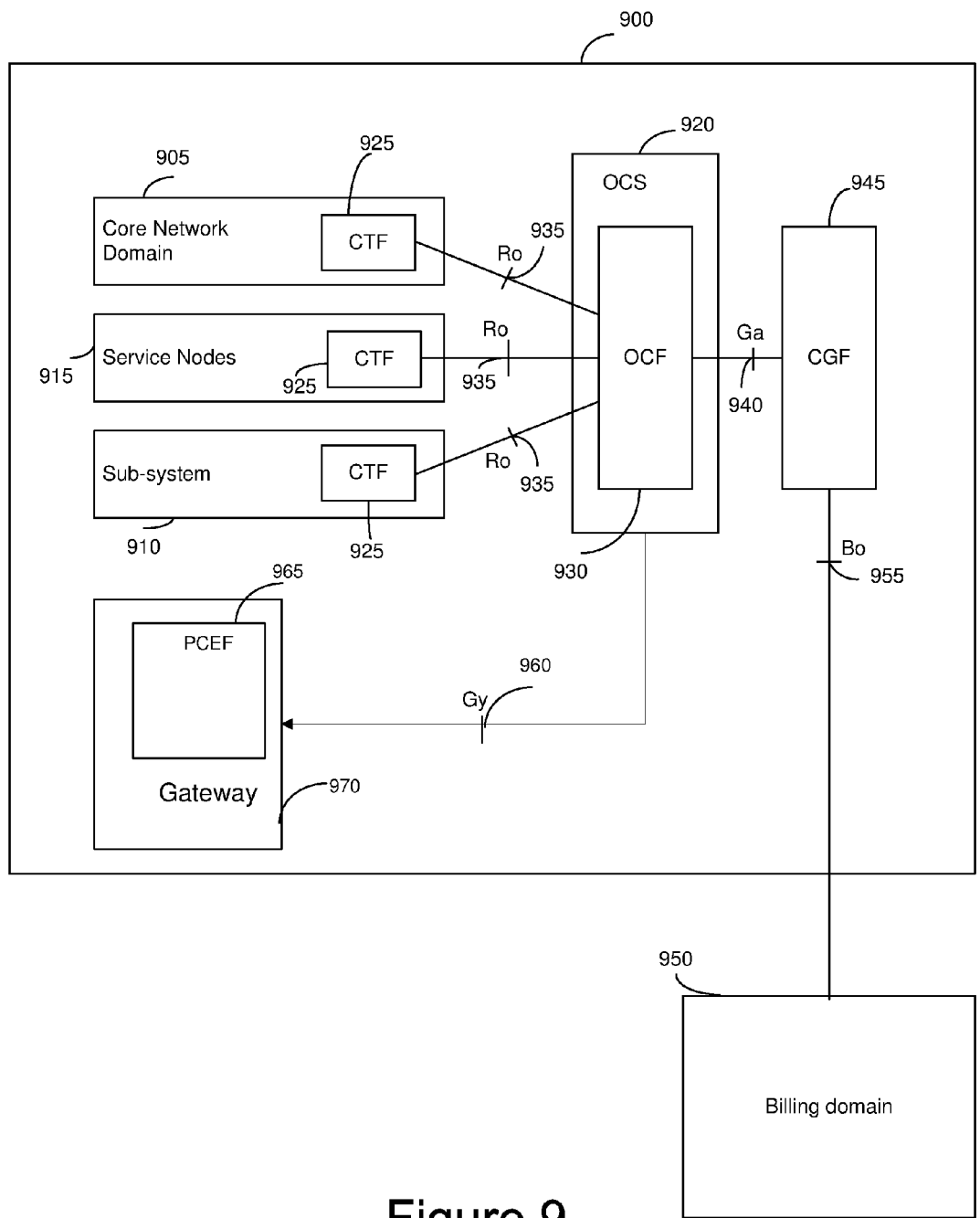
FIG. 9 is a block diagram showing an example charging architecture wherein the invention is useful.

FIG. 9 is a block diagram showing an example charging architecture wherein the invention is useful.

The architecture is described for an online scenario but the invention is equally applicable for an offline scenario.

A Communication network 900 provides functions that implement online charging mechanisms as charging clients in charging trigger functions (CTF) of Network Elements (NE) on the core network 905—e.g. Evolved Packet Core (EPC), subsystem 910—e.g. IP Multimedia Subsystem (IMS) and service 915—e.g. Multimedia Messaging System (MMS) levels. In order to support these charging mechanisms, the network performs real-time monitoring of required network resource usage on the above three levels in order to detect relevant chargeable events.

In online charging, a subscriber account holding subscriber related data as balance level of monetary funds, services subscribed to etc, located in an Online Charging System (OCS) 920, is queried prior to granting permission to use the requested network resource(s).

Typical examples of network resource usage are a voice call of certain duration, the transport of a certain volume of data, or the submission of a multimedia message of a certain size. The network resource usage requests may be initiated by a User Equipment UE (not shown) or by the network 900.

Online charging is a process where charging information for network resource usage is collected concurrently with that resource usage. However, authorization for the network resource usage is obtained by the network prior to the actual resource usage occurs. This authorization is granted by the OCS upon request from the network.

When receiving a network resource usage request the Charging Trigger Function (CTF) 925 of the network assembles the relevant charging information and generates a charging event towards an Online Charging Function (OCF) 930 of the OCS in real-time. The OCS then returns an appropriate resource usage authorization. The resource usage authorization may be limited in scope (e.g. service unit quota of volume of data or duration), therefore the authorization may have to be renewed from time to time as long as the network resource usage persists.

The charging event is forwarded to the OCF in order to obtain authorization including a service usage quota for the chargeable event/network resource usage requested by the UE or network. The CTF is also able to track the availability of resource usage permission ("quota supervision") during the network resource usage.

Online charging in the Circuit Switched (CS) and Packet Switched (PS) domains may also be performed using the Customized Applications for Mobile networks Enhanced Logic (CAMEL) Application Part (CAP) protocol and the CAP reference point from the Mobile Switching Centre (MSC) and Serving GPRS Support Node (SGSN), respectively, to the OCF. Other network elements may employ an Ro reference point 235 for online charging using Diameter Credit Control application. Similarly, Wo reference point may be employed for Wireless Local Area Network (WLAN), Gx and Gy reference points may be employed for Policy and Charging Control (PCC) according to the 3rd Generation Partnership Project 3GPP as described in TS 23.203 V10.2.1 (2011 January).

The Ro reference point from the CTF 925 to the OCF 930 is intended for the transport of charging events for online charging. A Ga 940 reference point is the interface between the OCF and a Charging Gateway Function (CGF) 945 which connects a Billing Domain (BD) 950 over a Bo 955 reference point. Similarly, for an offline charging architecture, the CGF connects to the Billing Domain over a Bx interface (not shown). The billing domain will contain appropriate components of a business support system (BSS) for receiving data records over the Bx or Bo reference points for, for example, rating and charging and storing.

The Ro reference point supports interaction between a Charging Trigger Function and an Online Charging Function. The following information may flow across this reference point:

Charging events for online charging from the CTF to the OCF.

Receive acknowledgements for these charging events from the OCF to the CTF. The acknowledgement grants or rejects the network resource usage requested in the charging event, according to the decision taken by the OCS.

The CAP reference point provides similar functionality for online charging as Ro, however, it is based on CAMEL techniques.

Different mappings of the online charging functions, CTF, OCF and CGF, onto physical implementations are possible.

Each CTF may have an OCF address list to which it can send its charging events and/or charging requests.

A data access unit according to embodiments disclosed herein can advantageously be within an OCS, CGF or billing domain as previously described. Charging records may also be created by a data access unit located within the core network domain, service nodes or subsystem as appropriate.

Figure 10:
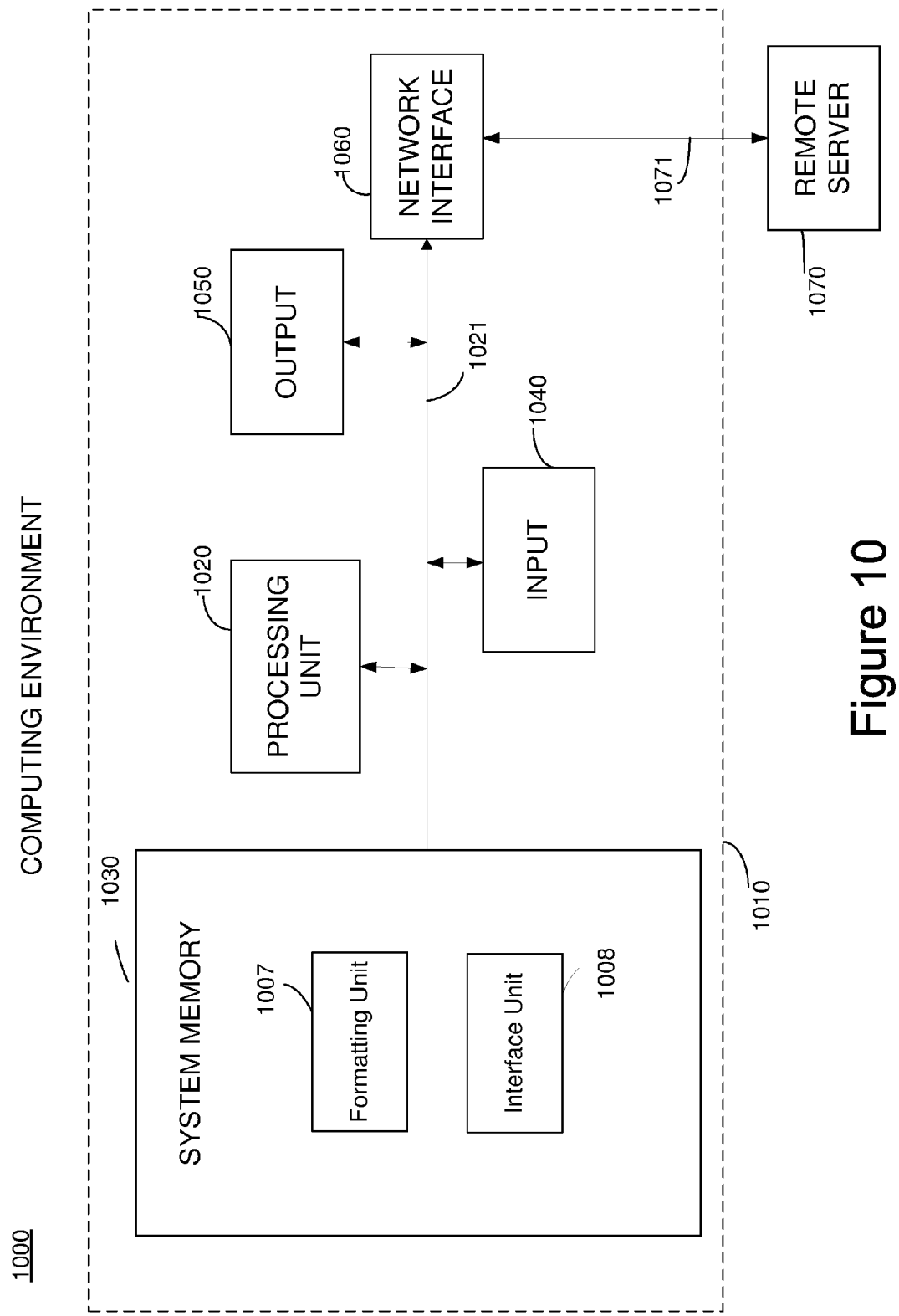
FIG. 10 is a block diagram showing an exemplary embodiment of a data access unit in the form of computing system environment 800.

FIG. 10 is a block diagram showing an exemplary embodiment of a data access unit in the form of computing system environment 1000.

Although as made clear above, the computing system environment 1000 is only one example of a suitable computing environment for an apparatus for storage of data records and is not intended to suggest any limitation as to the scope of use or functionality of the claimed subject matter. Further, the computing environment 1000 is not intended to suggest any dependency or requirement relating to the claimed subject matter and any one or combination of components illustrated in the example operating environment 1000.

An example of a device for implementing the previously described innovation includes a general purpose computing device in the form of a computer 1010. Components of computer 1010 can include, but are not limited to, a processing unit 1020, a system memory 1030, and a system bus 1021 that couples various system components including the system memory to the processing unit 1020. The system bus 1021 can be any of several types of bus structures including a memory bus or memory controller, a peripheral bus, and a local bus using any of a variety of bus architectures.

Computer 1010 can include a variety of computer readable media. Computer readable media can be any available media that can be accessed by computer 1010. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media can embody computer readable instructions, data structures, program modules or other data in a modulated data signal such as a carrier wave or other transport mechanism and can include any suitable information delivery media.

The system memory 1030 can include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, can be stored in memory 1030. Memory 1030 can also contain data and/or program modules that are immediately accessible to and/or presently being operated on by processing unit 1020. By way of non-limiting example, memory 1030 can also include an operating system, application programs, other program modules, and program data.

In some embodiments the steps of the algorithm or method performed by the invention is implemented as software modules loaded in the memory and processable by the processing unit, adapting the computing system environment for executing the steps of the algorithm or method described.

In one embodiment the data access unit comprises an interface unit 1008 adapting the data access unit 1000 for receiving a hierarchical charging record comprising part nodes with charging related data, retrieving a hierarchical charging record configuration definition specifying the data structure of the hierarchical charging record and retrieving a charging database configuration definition;

The data access unit further comprises a formatting unit 1007 adapting the data access unit for traversing the hierarchical charging record and for each part node of said hierarchical charging record identifying an attribute of the part node and determining if said attribute is a key attribute or a search attribute and if affirmative storing an attribute value of said attribute in a field of the serialized charging record based on the charging database configuration definition.

The interface unit is further adapting the data access unit for storing a part segment comprising the attribute value and a data value token in a payload body field of the serialized charging record with a part node indicator representing the location of the part node in the hierarchical charging record based on the hierarchical charging record configuration definition.

In another embodiment the data access unit 1000 comprises the interface unit 1008 adapting the data access unit for receiving a serialized charging record comprising part segments with charging related data and retrieving a hierarchical charging record configuration definition specifying the data structure of the hierarchical charging record.

The data access unit further comprises the formatting unit 1007 adapting the data access unit for extracting a payload body field from the serialized charging record and traversing the payload body field.

The traversing includes detecting a part node indicator identifying a part node; allocating memory for the part node determined by the hierarchical charging record configuration definition based on the part node indicator; detecting a data value token indicating a part segment; extracting properties from the data value token; allocating memory for an attribute of the part node, based on the properties; reading a data value from the part segment; and storing the data value to the memory allocated for the attribute of the part node.

The computer 1010 can also include other removable/non-removable and volatile/nonvolatile computer storage media. For example, computer 1010 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1021 through a non-removable memory interface such as an interface, and a magnetic disk drive or optical disk drive can be connected to the system bus 1021 by a removable memory interface, such as an interface.

A user can enter commands and information into the computer 1010 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 1020 through user input 1040 and associated interface(s) that are coupled to the system bus 1021, but can be connected by other interface and bus structures, such as a parallel port, game port or a universal serial bus (USB).

A graphics subsystem can also be connected to the system bus 1021. In addition, a monitor or other type of display device can be connected to the system bus 1021 through an interface, such as output interface 1050, which can in turn communicate with video memory. In addition to a monitor, computers can also include other peripheral output devices, such as speakers and/or printing devices, which can also be connected through output interface 1050.

The computer 1010 can operate in a networked or distributed environment using logical connections to one or more other remote computers, such as remote server 1070, which can in turn have media capabilities different from device 1010. The remote server 1070 can be a personal computer, a server, a router, a network PC, a peer device or other common network node, and/or any other remote media consumption or transmission device, and can include any or all of the elements described above relative to the computer 1010. The logical connections depicted in FIG. 10 include a network 1071, such as a local area network (LAN) or a wide area network (WAN), but can also include other networks/buses.

When used in a LAN networking environment, the computer 1010 is connected to the LAN 1071 through a network interface or adapter. When used in a WAN networking environment, the computer 1010 can include a communications component, such as a modem, or other means for establishing communications over a WAN, such as the Internet. A communications component, such as a modem, which can be internal or external, can be connected to the system bus 1021 through the user input interface at input 1040 and/or other appropriate mechanism.

In a networked environment, program modules depicted relative to the computer 1010, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added or inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

Embodiments of the invention may provide the following benefits and improvements:
Major improvements on throughput and latency when persisting or retrieving call transactions in billing or customer care
Massive reduction of required storage capacity
Update of already stored CRs is facilitated
As denoted above, the storage demands of a billing system are driven by the storage needs for usage data records. The storage devices for usage data records have to be optimized for throughput and latency. For this reason they are very expensive and have a large influence on total cost of ownership.

The invention may give savings of 10-75% on storage consumption for usage data records compared to the legacy storage method used example existing systems.

The invention claimed is:

1. A method for creating a serialized charging record formatted for insertion into a charging database, the method comprising:
receiving a hierarchical charging record comprising part nodes with charging related data;
retrieving a hierarchical charging record configuration definition specifying the data structure of the hierarchical charging record;
retrieving a charging database configuration definition;
traversing the hierarchical charging record and, for each part node of said hierarchical charging record, identifying an attribute of the part node;
determining whether said attribute is a key attribute or a search attribute and, if said attribute is a key attribute or a search attribute, storing an attribute value of said attribute in a field of the serialized charging record based on the charging database configuration definition; and,
at least in the event that said attribute is neither a key attribute or a search attribute, storing a part segment comprising the attribute value and a data value token in a payload body field of the serialized charging record with a part node indicator representing the location of the part node in the hierarchical charging record, based on the hierarchical charging record configuration definition.

2. The method of claim 1, wherein the step of storing the attribute value and the data value token in the payload body field of the serialized charging record is performed only in the event that the attribute is neither a key attribute nor a search attribute.

3. The method of claim 1, wherein storing an attribute value includes applying a type-specific algorithm to condense an attribute value of a specific type.

4. The method of claim 3, wherein:
an integer (INTEGER) attribute value is condensed by representing the attribute value with an n-byte integer type where n is smallest number of bytes sufficient to represent the attribute value; and/or
a double precision float (DOUBL) attribute value is condensed by omitting trailing zero bytes and setting the size of the attribute value in the first used byte; and/or
a date (DATE) attribute value is condensed by masking each byte of the date attribute value to obtain a half byte constituting a date character and pair wise concatenating the obtained half bytes.

5. The method of claim 1, wherein the payload body field is compressed by using a compression algorithm.

6. The method of claim 5, wherein a compression token indicating the compression is affixed to the payload body field.

7. The method of claim 5, where a compression token indicating the use of compression is stored in a byte array control header of the serialized charging record.

8. The method of claim 1, wherein the payload body field is a Binary Large Object (BLOB) or a Character Large Object (CLOB).

9. A method for creating a hierarchical charging record, the method comprising:
receiving a serialized charging record comprising part segments with charging related data;
retrieving a hierarchical charging record configuration definition specifying the data structure of the hierarchical charging record;
extracting a payload body field from the serialized charging record;
traversing the payload body field and:
(i) detecting a part node indicator identifying a part node;
(ii) allocating memory for the part node determined by the hierarchical charging record configuration definition based on the part node indicator;
(iii) detecting a data value token indicating a part segment;
(iv) extracting properties from the data value token;

(v) allocating memory for an attribute of the part node, based on the properties;
(vi) reading a data value from the part segment; and
(vii) storing the data value to the memory allocated for the attribute of the part node.

10. The method of claim 9, wherein after the step of traversing the payload body field performing the further step of processing a key and/or search column of the serialized charging record for injecting values of said key and/or search column into the hierarchical charging record, based on the hierarchical charging record configuration definition.

11. The method of claim 9, further comprising detecting a compression token affixed to the payload body field indicating a compression of the payload body field and subsequently uncompressing the payload body field based on the compression token, wherein said detecting and subsequently uncompressing are performed after the step of extracting a payload body field.

12. The method of claim 9, wherein the payload body field is a Binary Large Object (BLOB) or a Character Large Object (CLOB).

13. A data access unit for creating a serialized charging record formatted for insertion into a charging database, the data access unit comprising:
an interface unit adapted to receive a hierarchical charging record comprising part nodes with charging related data, retrieve a hierarchical charging record configuration definition specifying the data structure of the hierarchical charging record and retrieve a charging database configuration definition;
a formatting unit adapted to traverse the hierarchical charging record and, for each part node of said hierarchical charging record, identify an attribute of the part node determine whether said attribute is a key attribute or a search attribute and, if said attribute is a key attribute or search attribute, store an attribute value of said attribute in a field of the serialized charging record based on the charging database configuration definition;
wherein the interface unit is further adapted to, at least in the event that said attribute is neither a key attribute or a search attribute, store a part segment comprising the attribute value and a data value token in a payload body field of the serialized charging record with a part node indicator representing the location of the part node in the hierarchical charging record based on the hierarchical charging record configuration definition.

14. The data access unit of claim 13, wherein the interface unit is adapted to store the attribute value and the data value token in the payload body field of the serialized charging record only in the event that the attribute is not a key attribute or a search attribute.

15. The data access unit of claim 13, wherein the formatting unit is further adapted to store the attribute value by applying a type specific algorithm to condense an attribute value of a specific type.

16. The data access unit of claim 15, wherein the formatting unit is further adapted to:
condense an integer (INTEGER) attribute value by representing the attribute value with an n-byte integer type where n is smallest number of bytes sufficient to represent the attribute value; and/or
condense a double precision float (DOUBL) attribute value by omitting trailing zero bytes and setting the size of the attribute value in the first used byte; and or
condense a date (DATE) attribute value by masking each byte of the date attribute value to obtain a half byte constituting a date character and pair wise concatenating the obtained half bytes.

17. The data access unit of claim 13, wherein the formatting unit is adapted to compress the payload body field by using a compression algorithm.

18. The data access unit of claim 17, wherein the formatting unit is adapted to affix a compression token indicating the compression to the payload body field.

19. The data access unit of claim 17, wherein the formatting unit is adapted to store a compression token indicating the use of compression in a byte array control header of the serialized charging record.

20. The data access unit of claim 13, wherein the payload body field is a Binary Large Object (BLOB) or a Character Large Object (CLOB).

21. A data access unit for creating a hierarchical charging record formatted for insertion into a charging database, the data access unit comprising:
an interface unit adapted to receive a serialized charging record comprising part segments with charging related data and retrieve a hierarchical charging record configuration definition specifying the data structure of the hierarchical charging record;
a formatting unit adapted to extract a payload body field from the serialized charging record and to traverse the payload body field by:
(i) detecting a part node indicator identifying a part node;
(ii) allocating memory for the part node determined by the hierarchical charging record configuration definition based on the part node indicator;
(iii) detecting a data value token indicating a part segment;
(iv) extracting properties from the data value token;
(v) allocating memory for an attribute of the part node, based on the properties;
(vi) reading a data value from the part segment; and
(vii) storing the data value to the memory allocated for the attribute of the part node.

22. The data access unit of claim 21, wherein the formatting unit is further adapted to process a key and/or search column of the serialized charging record and to inject values of said key and/or search column into the hierarchical charging record based on the hierarchical charging record configuration definition.

23. The data access unit of claim 21, wherein the formatting unit is further adapted to detect a compression token affixed to the payload body field indicating a compression of the payload body field and to subsequently uncompress the payload body field based on the compression token.

24. The data access unit of claim 21, wherein the payload body field is a Binary Large Object (BLOB) or a Character Large Object (CLOB).

* * * * *